United States Patent [19]

Tatsuno et al.

[11] Patent Number: 4,904,068
[45] Date of Patent: Feb. 27, 1990

[54] OPTICAL DEVICE WITH PHASE-LOCKED DIODELASER ARRAY

[75] Inventors: Kimio Tatsuno, Tokyo, Japan; Carolus J. van der Poel; Gerard A. Acket, both of Eindhoven, Netherlands

[73] Assignees: Hitachi Ltd., Tokyo, Japan; U.S. Philips Corporation, New York, N.Y.

[21] Appl. No.: 162,828

[22] Filed: Mar. 2, 1988

[30] Foreign Application Priority Data

Oct. 5, 1987 [EP] European Pat. Off. ........ 87201896.5

[51] Int. Cl.⁴ ...................... G02B 13/10; G02B 27/46; G11B 7/00
[52] U.S. Cl. ................. 350/421; 350/162.12; 350/162.15; 350/448; 369/112
[58] Field of Search ........... 350/420, 421, 448, 162.12, 350/162.15; 369/112

[56] References Cited

U.S. PATENT DOCUMENTS

| | | | |
|---|---|---|---|
| 4,082,431 | 4/1978 | Ward, III | 350/448 X |
| 4,323,297 | 4/1982 | Kawamura et al. | 350/421 X |
| 4,410,237 | 10/1983 | Veldkamp | 350/421 X |
| 4,580,879 | 4/1986 | Wilson | 350/421 |
| 4,643,538 | 2/1987 | Wilson | 350/421 |
| 4,759,616 | 7/1988 | Marchant | 350/421 |
| 4,770,507 | 9/1988 | Arimoto et al. | 350/421 |

Primary Examiner—Scott J. Sugarman

[57] ABSTRACT

An optical device includes a phase-locked diodelaser array (10), a collimator lens (17), and behind the collimator lens a prism system (30, 34) of at least one prism to broaden the far field radiation pattern in the lateral plane (XY) and a spatial filter (19) to select a favored mode. The laser radiation is concentrated into a single, round and diffraction limited spot (V).

14 Claims, 3 Drawing Sheets

OPTICAL DEVICE WITH PHASE-LOCKED DIODELASER ARRAY

BACKGROUND OF THE INVENTION

The present invention relates to an optical device for delivering a single radiation beam with circularly symmetrical cross-section and intensity distribution, comprising a phase-locked diodelaser array and a collinator lens. The invention also relates to an optical apparatus for scanning an information medium, such as an optical disc recorder and/or player or a laser printer, comprising such optical device.

The European patent application No. 0.100.242 discloses such optical device with a phase-locked diodelaser array, which is a special kind of multi-emitter semi-conductor laser. There is an increasing interest in phase-locked diodelaser arrays because they can deliver a considerably higher output power than a single-emitter diodelaser. For many applications it is necessary to focus the output power of all of the emitters into a single, circularly and diffraction limited spot with as high efficiency as possible. Such focussing cannot be carried out by a high-aperture objective lends solely, because of the specific radiation pattern of the phase-locked laser array.

Such an array with N emitters radiates in N so-called supermodes, and the laser array itself selects that, or those, supermode(s) for which its threshold current is minimum. The threshold current is the value of the current perpendicular to the p-n-junction layer at which the laser action starts. A diodelaser array with a specific internal construction will radiate in one supermode. The most interesting modes for practical use are the fundamental, or zero order, single-lobe supermode which has a uniform near field wavefront and the highest order double-lobe supermode which shows a great stability.

In the theory of diodelaser arrays the terms "near field distribution" and "far field distribution" are used. The near field phase-or intensity distribution is the distribution at the position of the emitting facet of the diodelaser array, or in a plane conjugate to this facet. The far field phase-or intensity distribution is the result of the interference of the individual beams emanating from the individual slit-shaped emitters of the array. The far field distribution is formed at some distance from the emitting facet. The near- and far field in this application are reserved for those fields in the lateral plane, i.e. the plane through the axis of the radiation pattern and parallel to the p-n-junction layer. The plane perpendicular to the layer and through the axis is the transversal plane.

In order to obtain a single circular spot from a phase-locked diodelaser array, it is proposed in the European patent application No. 0.100.242 to use one or more cylindrical lenses and a spatial filter, in the form of a limiting aperture, arranged in the image plane, or its conjugate, of the laser emitting facet. The spatial filter, which should select one of the lobes is critical as to its dimension and position, because it is arranged in the lateral beam waist plane, where the beam is very small. The use of cylindrical lenses provides some disadvantages. A cylindrical lens is quite critical as to its orientation with respect to the optical axis of the device and to shifting of its central line with respect to said axis. A small tilting or shifting of a cylindrical lens with respect to said axis may influence the optical behaviour of this lens. Moreover, when introducing cylindrical lenses in an optical system to enlarge a beam, the optical path length of this system increases. In the case of two cylindrical lenses the magnification is proportional to the quotient of their focal lengths. When the optical length would be decreased, spherical aberrations would occur. Cylindrical lenses which are corrected for such aberrations are not available for reasonable prices.

SUMMARY OF THE INVENTION

An optical device according to the invention is compact and moreover enables a diffraction limited radiation spot, which is free of aberrations. Behind the collinator lens are arranged in this order, a prism system of at least one prism having, in a lateral plane through the optical axis and parallel to the p-n-junction layer, an entrance face being inclined with respect to the axis of the incident radiation and an exit face being perpendicular to the axis of the emergent radiation, and a spatial filter in the lateral far field of the diodelaser array.

The prism system broadens the beam in the lateral direction so that its lateral width becomes equal to its transversal width. The spatial filter blocks the unwanted lobes and transmits only the enlarged selected lobe. Because of its position in the far field this filter is less critical as to its dimension and position. In addition to its anamorphotic function the prism system also has a de-astigmatism effect. The, spherical, collinator lens is so arranged and dimensioned that the radiation leaving this lens still has some wavefront-sphericity. As is known, when a divergent, or convergent, beam passes through a prism, this prism will impart astigmatism to the beam. The astimgatic effect of the prism is used to correct for the astigmatism of the diodelaser array.

Preferably the angle opposite said entrance face of the one prism is 90 degrees.

Such a prism is easier to manufacture than a prism wherein the angle is different from 90 degrees. Moreover the 90 degree angle simplifies positioning of the prism during assembling the optical device.

The spatial filter may be formed by a diaphragm arranged behind the last prism of the prism system. The spatial filter may be constituted by a black coating, leaving a central circular opening, on the exit face of the last prism of the prism system. Then no separate diaphragm is needed so that the optical unit becomes simpler and easier to manufacture.

The same advantages are obtained if the spatial filter is constituted by the boundaries of the last prism of the prism system.

If the optical device is part of an optical apparatus wherein the diodelaser array radiation should be focussed in a diffraction limited spot, the spatial filter may be constituted by the entrance pupil of the spot forming lens of the apparatus.

As stated hereinbefore, the prism system may consist of only one prism. However such a prism causes the axis of the emergent beam to have a direction different from that of the axis of the incident radiation. Especially for an optical device to be used in an apparatus for recording and/or reading an optical record carrier this is less appropriate, because in that case it is preferred to accommodate the optical device into a tubular holder with a small cross-section.

Preference is therefore given to an optical device wherein the prism system comprises two prisms whereby the exit face of the last prism is perpendicular to the axis of the radiation incident on the first prism.

Then the axis of the beam emanating from the last prism is parallel to that of the incident radiation and the beam enlargement can be greater than in a one prism system, which is of importance when the diodelaser array comprises an increased number of radiating slits and consequently an increased transversal to lateral far field beam dimension quotient. On the other hand using two prisms instead of one for the sam elateral beam enlargment means that the enlargment power of each prism can be halved so that less stringent requirements are to be set on alignment and tolerances of the prisms.

An embodiment which is even further improved comprises four prisms, whereby in the lateral plane the exit faces of the second and fourth prism are perpendicular to the axis of the radiation incident on the first prism.

In this embodiment the axis of the emergent beam extends in the direction of the axis of the radiation incident on the first prism.

The invention may advantageously be used in an apparatus for optically recording an optical record carrier and comprising an optical head for generating a radiation spot modulated in intensity according to the information to be recorded, because of the relative high recording intensity involved. This apparatus is characterized in, that the optical head comprises an optical device as described hereinbefore and an objective lends for focussing the beam from said device into a diffraction limited round spot on the record carrier.

The invention may also be used in an apparatus for reading a record carrier and comprising an optical head wherein a radiation spot for scanning the record carrier is generated. The optical head comprises an optical device as described hereinbefore and an objective lens for focussing the beam from the device into a diffraction limited round spot on the record carrier.

The invention may also be used advantageously in an apparatus for laser printing information on a recording medium comprising a recording medium carrier movable in a first direction and a beam deflector for scanning a radiation beam along a second direction perpendicular to the first direction. This apparatus comprises an optical device as described hereinbefore for generating and an objective lens for focussing the beam from said device into a diffraction limited radiation spot on the recording medium.

In any of the three mentioned apparatus the spatial filter of the optical device may be constituted by the entrance pupil of the objective lens.

DETAILED DESCRIPTION OF THE PREFERRED EMBODIMENT

Figure 1:
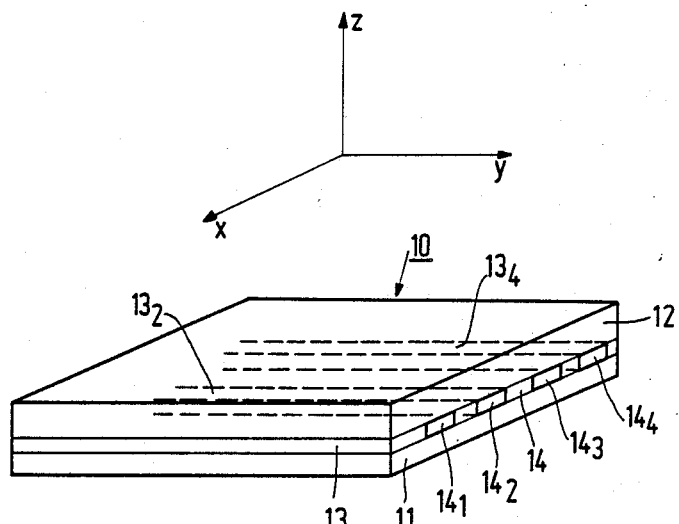
FIG. 1 shows, in perspective view, a semiconductor laser unit.

FIG. 1 shows schematically and in perspective view a multi-emitter semiconductor laser unit, a so-called phase-locked diodelaser array. This laser unit comprises, amongst others, a first layer 11 of p-type material, a second layer 12 of n-type material and an intermediate layer 13, or p-n-junction layer, wherein the laser action takes place when an electric current above a certain threshold value is sent through the laser unit in the Z-direction. The laser radiation emanates through the first facet, or cleaved surface, 14 of the layer 13 and propagates in the Y-direction. This radiation shows a first, small, divergence in the XY-plane, called the lateral plane, and a second, greater, divergence in the YZ-plane, called the transversal plane.

The p-n-junction layer comprises a number of radiation guiding stripes $13_1$, $13_2$ etc. which are separated from each other by intermediate stripes. For clearness sake in FIG. 1 only four guiding stripes are shown but their number may amount to ten or more. As is known, for example from the paper: "Phased Array Diode Lasers" in "Laser focus / Electro-Optics", June 1984, W. Streifer et al., such phase-locked laser array provides the advantage of a considerably increased power output relative to a single stripe diodelaser. This laser unit is therefore very well suited to record information on an optical medium like an optical disc or the recording medium of a laser printer. The radiation of all of the individual stripes should then be concentrated into a single, round and diffraction limited radiation spot. Besides a combination of a first lens which collimates the radiation and a second lens which focusses the radiation, additional optical elements are needed, because of the specific radiation pattern of a diodelaser array.

Figure 2A:
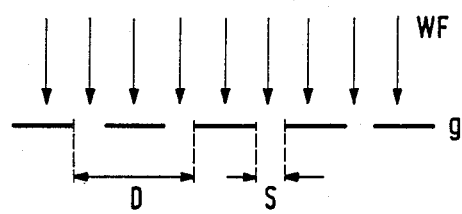
FIG. 2a illustrates the grating like structure of the laser array.

As is known, for example form the mentioned article in "Laser Focus / Electro-Optics", June 1984 issue, an N-emitter laser array may radiate in N supermodes and a laser array with a specific internal structure selects itself one of the supermodes to minimize its threshold current. The present invention is of special interest for a diodelaser array which radiates in the fundamental, or zero order, supermode. This mode for which the radiations of all of the lasing stripes are in phase is of great interest in practice because its near field phase distribution, or wavefront, is uniform. The near field is the field at the emitting facet 14 of thelaser array, which may be regarded as a grating g on which a plane wavefront WF is incident, as shown in FIG. 2a. The individual subbeams of the radiating stripes interfere with each other so as to form an interference pattern, or intensity distribution, in the far field at the entrance pupil of the collimator lens.

Figure 2B:
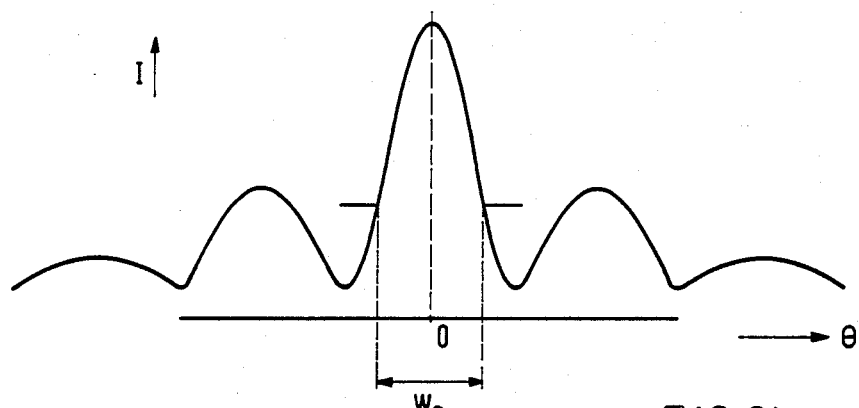
FIG. 2b represents the far field radiation distribution of the laser array.

This pattern is shown in FIG. 2b, wherein I is the intensity and $\theta$ is the angular position in the far field with respect to the optical axis of the system. The far field pattern is given by the product of $\lambda/D$ multiplied by the radiation pattern of a single emitting stripe. $\lambda$ is the wavelength of the radiation and D is the period of the grating. The intensity pattern in the lateral plane is composed of a central, main, lobe and a number of side lobes on both sides of the main lobe. The FWHM, i.e. the width of the lobe at the intensity which is $1/e^2$ of the maximum intensity is given by $$W_e = \frac{\lambda}{N.D.}$$

wherein N is the number of radiating stripes. In the transversal plane the far field distribution has only one broad lobe.

The main far field lateral lobe has its beam waist, or its single virtual point of origin, situated at a small distance behind the laser facet. A single spot can be obtained when the radiation pattern is expanded such that the side lobes shift outside the optical system and only the main lobe is passed through this system. This can be called spatial filtering in the far field. Masking of the sides lobes can also be regarded as a reduction of the numerical aperture of the spot forming lens, such that the resolving power of this lends is too small to discriminate the intermediate stripes between the radiating stripes of the laser array. By the spatial filtering interference between the main lobe and the other lobes is avoided.

Because in the lateral plane the point of origin of the main lobe is situated behind the laser facet, whereas in the transversal plane this point lies at the laser facet, the lobe, and the laser array radiation as a whole, shows astigmatism in an analog way as a single emitter diodelaser of the gain guided type. In order to obtain a single diffraction limited, aberration free, spot this astigmatism should be eliminated.

The laser array is a linear shaped emitter; an arry of ten emitters for example measures for example 40 $\mu m \times 2$ $\mu m$. The aperture of the composed beam emitted by the diodelaser array is relative small in the lateral plane and relative large in the transversal plane. Down stream of the emitting facet the composed radiation beam has an elliptical cross-section and for obtaining a round sopt the beam should be reshaped so that its cross-section becomes circular.

According to the present invention the radiation of a phase-locked laser array is converted into a beam suited for forming a single, round and diffraction limited radiation spot by enlarging the radiation pattern in the lateral plane and by filtering the favoured, for example the fundamental, supermode, whereby the functions of enlarging, beam shaping and astigmatism elimination are performed by one and the same prism system.

In a device with a phase-locked diodelaser array radiating in the highest order supermode with two lobes and wherein the adjacent stripes have a phase difference of 180 degrees, in the radiation path a phase plate can be arranged having alternating first and second areas introducing phase shifts of 180 degrees and 0 degrees respectively. Then a radiation pattern with one central lob instead of two central lobes is obtained. From this radiation pattern a single, round, and diffraction limited radiation spot can be obtained by using the present invention.

This invention is not limited to cases wherein a central lobe is selected; it can also be used for diodelaser arrays wherein other radiation modes are selected. Moreover the diodelaser array may be of the index guided- or gain guided type.

Figure 3A:
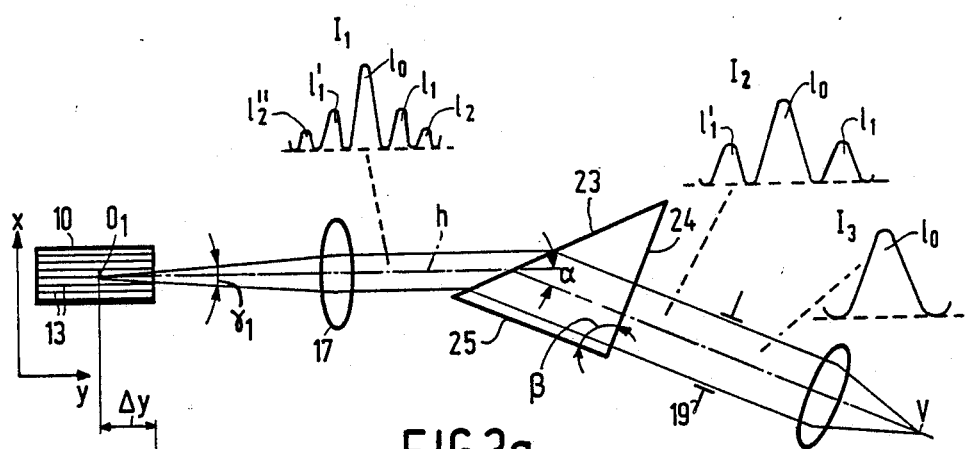
FIGS. 3a and 3b show a first embodiment of the optical device according to the invention in a lateral and transversal section respectively.
Figure 3B:
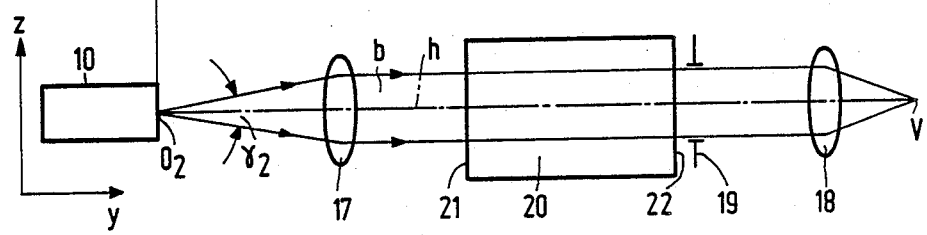

The FIGS. 3a and 3b show a first embodiment of the optical device in the lateral and transversal cross-section respectively. In these FIGS. 10 is the diodelaser array with guiding stripes 13. The composed radiation beam b emitted by the array has an opening angle $\gamma_1$ in the lateral plane and a point of origin $0_1$ in this plane, whereas in the transversal plane this angle is $\gamma_2$ and the point of origin is $0_2$. The distance $\Delta Y$ between $O_1$ and $O_2$, is the astigmatic distance. In the radiation path of the composed beam is arranged a lens 187 such that it nearly collimates the beam in the transversal plane. In the lateral plane however the wavefront of the beam after passage through the lens 17 is more curved, due to the $\Delta Y$ shift of the point of origin $0_1$ in this plane. Behind the collimator lens 17 a prism 20 is arranged. In the transversal plane this prism only slightly affects the beam because the collimated beam is nearly perpendicular to the entrance face 21 and the exit face 22 of the prism. In the lateral plane however the entrance face 23 is arranged at an angle $\alpha$ with the axis h of the beam. At said plane 23 refraction occurs such that the beam is widened, in dependency of the angle $\alpha$. This means that the far field radiation pattern of the laser array radiation is spread, as is illustrated in the upper part of FIG. 3a wherein the far field pattern at different positions along the optical path are shown. Behind the prism 20 a diaphragm 19 is arranged. The opening of this diaphragm and the orientation and parameters of the prism 20 are so adapted to each other that the diaphragm passes for example only the central lobe $1_0$ of the radiation pattern and blocks all of the sides lobes $1_1$, $1'_1$ etc.

Thus a beam is obtained which has such distribution that it can be concentrated by an objective lens 18 in a single spot V. By adapting the numerical aperture of this lens to the beam cross-section, so that the lens pupil is adequately filled, a diffraction limited spot having minimal dimensions is obtained.

Care is taken that the enlargement of the beam in the lateral plane is such that the beam dimension in this plane is equal to that in the transversal plane, so that the beam leaving the prism has a circular cross-section and consequently the spot V is round.

Because especially in the lateral plane the beam passing through the skew prism is not collimated, the prism imparts astigmatism to the beam. It can be arranged such that this astigmatism compensates the astigmatism of the diodelaser array, so that the wavefront of the beam from the prism has the same curvature in the lateral and transversal planes.

The angle $\beta$ between the faces 24 and 25 of the prism 20 may have an arbitrary value. In practice it is preferred that this angle is 90 degrees because of easier manufacturing and assembling. These remarks hold also for the other embodiments of the prism system to be described yet.

Figure 4A:
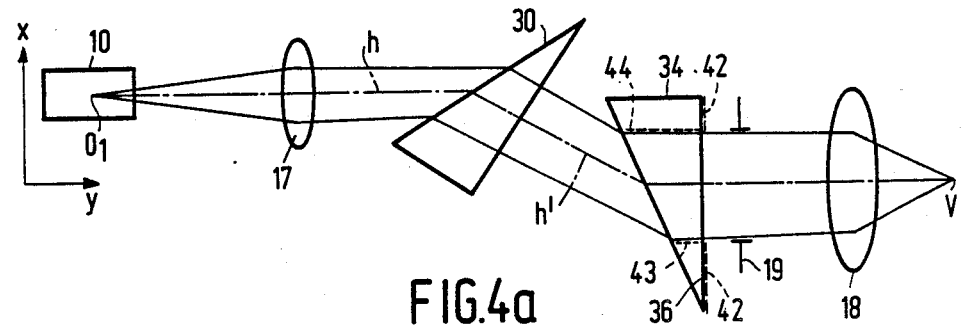
FIGS. 4a and 4b show a second embodiment of this device in the same sections.
Figure 4B:
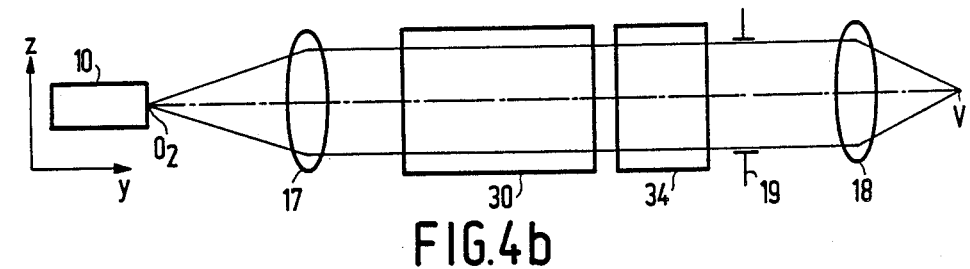

The first of these embodiments is shown in FIGS. 4a and 4b, in lateral and transversal cross-section respectively, and comprises two prisms 30 and 34. By using a second prism it becomes possible to bend the axis h' back so that it is parallel to the axis h of the incident radiation. Then the transversal dimension of the device is decreased, which is of importance especially when the device is to be used in an optical disc recorder/-player. Moreover in the embodiment of FIGS. 4a and 4b for each prism less beam-widening power of the prisms is needed.

Figure 5A:
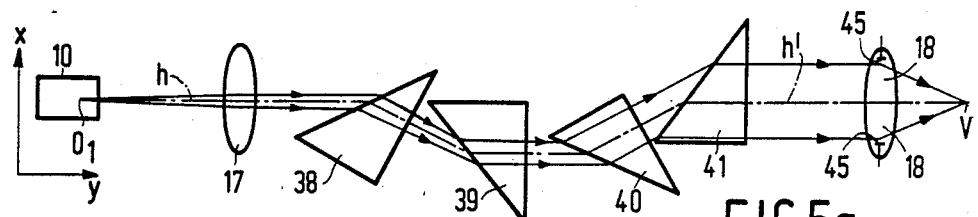
FIGS. 5a and 5b show a third embodiment again in a lateral and transversal section.
Figure 5B:
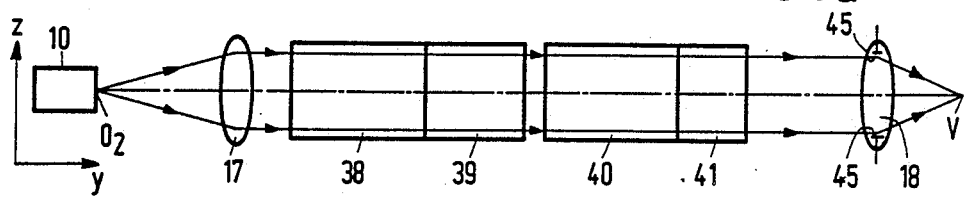

FIGS. 5a and 5b show an embodiment of the optical device with four prisms 38, 39, 40 and 41. Besides that the beam-widening power needed for each prism is further reduced, the embodiment has the advantage that axis h' of the emergent radiation is coincident with axis h of the incident radiation, so that the device can be housed in a tubular holder with small cross-section.

In the embodiments with two or four prisms the beam-widening power is preferably equally divided over the prisms. The prisms preferably have the same shape and dimensions, which considerably decreases the manufacturing costs of the device.

In the embodiments of FIGS. 3, 4 and 5 the spatial filter may be constituted by a separate element (19) in the form of a diaphragm on a separate holder. It is also possible that such diaphragm is fixed to the exit face, 24 respectively 36, of the last prism in the embodiments of FIGS. 3 and 4 respectively and of FIG. 5. As indicated in FIG. 4a it is also possible to apply an opaque coating 42, leaving a central opening, on said faces. Another possibility is that the boundaries of said last prism form a natural stop for the radiation towards the spot-forming lens 18 as indicated in FIG. 4a by the interrupted lines 43, 44. Finally in an apparatus wherein the spot-forming lens 18 is arranged close to the last prism 41 of the prism system, the spatial filter may be formed by the pupil of the spot forming lens, as indicated by 45 in FIGS. 5a and 5b.

Figure 6:
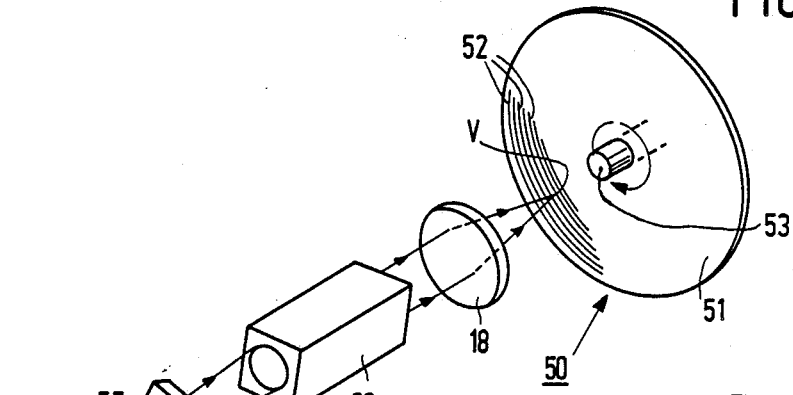
FIG. 6 represents an apparatus for recording an optical disc comprising the device of the invention.

FIG. 6 shows schematically an apparatus for recording information in a surface 51 of an optical record carrier 50. The surface 51 may be provided with prerecorded servo tracks 52. The phase-locked diodelaser array designated 10 emits a beam b which should be focussed by an objective lens 18 to a high-intensity, round and diffraction limited radiation spot V on the information surface 51. According to the present invention between the laser array 10 and the objective lens 18 a unit 60, comprising a collimator lens a prism system and a spatial filter as shown in FIGS. 3a and 3b, or FIGS. 4a and 4b, or FIGS. 5a and 5b is arranged to convert the radiation form the laser array into a collimated, rotationally symmetrical beam.

Recording of an information track is performed by modulating the beam intensity in accordance with the information to be recorded and by rotating the record carrier around its axis 53. By gradually moving the whole optical head with elements 10, 60 and 18, or part of it, in the radial direction of the record carrier, all of the tracks can be successively recorded. Modulation of the recording beam can be performed for example, by modulating the electric current through the laser unit.

By arranging a beam separator, for example a beam dividing mirror 55, before or behind the block 60, which separator directs part of the beam reflected from the record carrier towards a photosensitive detector 56, the apparatus of FIG. 6 can be used for reading the information recorded on the record carrier. During reading the beam has a constant intensity of such level that it cannot provoke any change in the recording surface.

Figure 7:
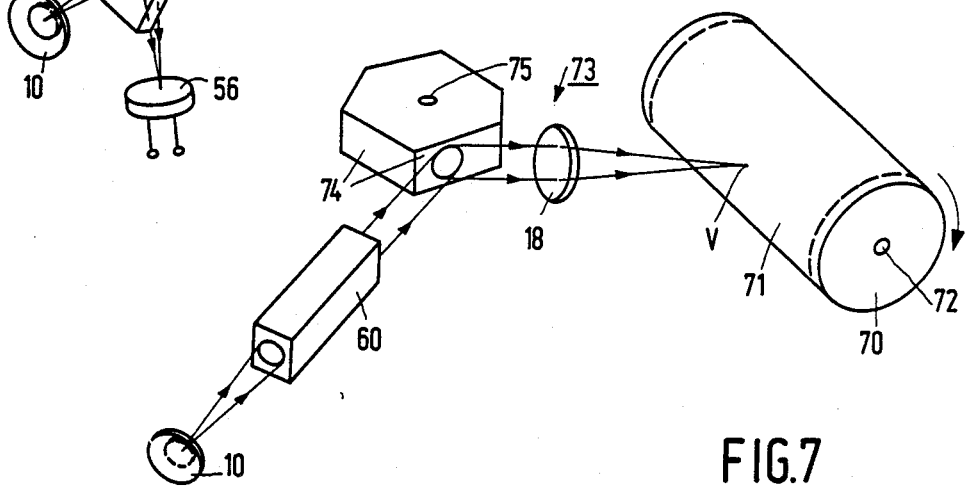
FIG. 7 shows a laser printer comprising this device.

FIG. 7 shows schematically a laser printer with a recording medium 71, for example wrapped around a drum 70 which, for recording successive lines, is rotated around its axis 72. Line scanning is performed for example by a polygon 73 carrying a number of mirror facets 74 and rotating around its axis 75. 18 is an objective lens which should focus the radiation from a phase-locked diodelaser array 10 and reflected by a facet 74 to a round spot V of small diameter on the recording medium. The laser beam is modulated in intensity according to the information to be recorded, either by the electric current through the laser unit or by a separate modulator in the path of the beam.

To convert the composed beam from the laser array, which beam is divergent and has an elliptical wavefront, into a collimated beam with a rotationally symmetrical wavefront, a block 60 comprising a collimator lens a prism system and a spatial filter as shown in FIGS. 3a and 3b, or FIG. 4a and 4b, or FIGS. 5a and 5b, is arranged between the laser unit 10 and the objective lens 18.

That the invention has been described in connection with information recording apparatus does not mean that it is restricted to these apparatus. The invention can be used in all apparatus wherein a high-intensity small and round spot should be formed out of the radiation of a phase-locked diodelaser array. As an example can be mentioned a projection TV apparatus with light valves of Liquid Crystal Displays for modulating the laser radiation with (color) TV information. Also in long-haul fiber optical communication systems or in chirurgical instruments the present invention can be used.

What is claimed is:

1. An optical device comprising:
a phase-locked diodelaser array having a p-n junction layer in a first plane for producing a radiation beam on an optical axis;
means for collimating said beam;
prism means for enlarging said beam in a lateral plane parallel to said first plane and intersection said axis; and
spatial filter means in the far field of said array for confining said beam in said lateral plane.

2. The optical device of claim 1 wherein said prism means comprises a prism having an entrance face in said lateral plane, said entrance face inclined with respect to the axis of said radiation beam as incident thereof, and an exit face perpendicular to the axis of said radiation beam as it exits therefrom. diodelaser array.

3. Optical device as claimed in claim 2 wherein the angle opposite said entrance face of said at least one prism is 90 degrees.

4. Optical device as claimed in claim 1 wherein the spatial filter is constituted by a black coating, leaving a central circular opening, on the exit face of the last prism of the prism system.

5. Optical device as claimed in claim 1 wherein the spatial filter is constituted by the boundaries of the last prism of the prism system.

6. Optical device as claimed in claim 2 wherein the prism system comprises two prisms whereby the exit face of the last prism is perpendicular to the axis of the radiation incident on the first prism.

7. Optical device as claimed in claim 1 wherein it comprises four prisms, whereby in the lateral plane the exit faces of the second and fourth prism are perpendicular to the axis of the radiation incident on the first prism.

8. Apparatus for optically recording an optical record carrier comprising an optical head for generating a radiation spot modulated in intensity according to the information to be recorded wherein said optical head comprises an optical device for delivering a single radiation beam with a circularly symmetrical cross section and intensity distribution, and an objective lens for focusing the beam from said device into a diffraction limited round spot on the record carrier, said device comprising:
a phase-locked diodelaser array having a p-n junction layer in a first plane for producing a radiation beam on an optical axis;
lens means for collimating said beam;

prism means for enlarging said beam in a lateral plane parallel to said first plane and intersecting said axis; and spatial filter means in the far field of said array for confining said beam in said lateral plane.

9. Apparatus as claimed in claim 8 wherein the spatial filter of the optical device comprises the entrance pupil of the objective lens.

10. Apparatus for reading a record carrier comprising an optical head wherein a radiation spot is generated for scanning the record carrier, and wherein the optical head comprises an optical device for delivering a single radiation beam with a circularly symmetrical cross section and intensity distribution and an objective lens for focusing the beam from said device into a diffraction limited spot on the record carrier, said device comprising:

a phase-locked diodelaser array having a p-n junction layer in a first plane for producing a radiation beam on an optical axis;

lens means for collimating said beam;

prism means for enlarging said beam in a lateral plane parallel to said first plane and intersecting said axis; and spatial filter means in the far field of said array for confining said beam in said lateral plane.

11. Apparatus as in claim 10 wherein the spatial filter of the optical device comprises the entrance pupil of the objective lens.

12. Apparatus for laser printing of information on a recording medium comprising a recording medium carrier movable in a first direction and a beam deflector for scanning a radiation beam along a second direction perpendicular to first direction, comprising an optical device for delivering a single radiation beam with a circularly symmetrical cross section and intensity distribution, and an objective lens for focusing the beam from said device into a diffraction limited radiation spot on the recording medium, said device comprising:

a phase-locked diodelaser array having a p-n junction layer in a first plane for producing a radiation beam on an optical axis;

lens means for collimating said beam;

prism means for enlarging said beam in a lateral plane parallel to said first plane and intersecting said axis; and spatial filter means in the far field of said array for confining said beam in said lateral plane.

13. Apparatus as in claim 12 wherein the spatial filter of the optical device comprises the entrance pupil of the objective lens.

14. Beam forming apparatus for use in combination with a diode laser array that produces a multilobed beam having a smaller divergence in a lateral plane than in a transveral plane for producing a single spot having a circularly symmetrical cross section and intensity distribution comprising:

spatial filter means disposed in the far field of said array for blocking at least one minor lobe of said beam; and means disposed between said array and said spatial filter means for enlarging said beam in the lateral plane.

* * * * *